(12) United States Patent
Ahrns

(10) Patent No.: US 9,359,940 B2
(45) Date of Patent: *Jun. 7, 2016

(54) DIRECT MANIFOLD BOOST ASSIST DEVICE WITH THROTTLE BODY MANIFOLD VOLUME ISOLATION

(71) Applicant: Ford Global Technologies, LLC, Dearborn, MI (US)

(72) Inventor: Chris C. Ahrns, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 473 days.

This patent is subject to a terminal disclaimer.

(21) Appl. No.: 13/863,170

(22) Filed: Apr. 15, 2013

(65) Prior Publication Data

US 2014/0305412 A1   Oct. 16, 2014

(51) Int. Cl.
  *F02B 33/44* (2006.01)
  *F02B 37/14* (2006.01)
  *F02D 41/00* (2006.01)
  *F02B 37/04* (2006.01)
  *F02B 37/16* (2006.01)
  *F02B 37/18* (2006.01)
  *F02B 39/10* (2006.01)
  *F02D 41/10* (2006.01)

(52) U.S. Cl.
  CPC .............. *F02B 37/14* (2013.01); *F02D 41/005* (2013.01); *F02D 41/0007* (2013.01); *F02B 37/04* (2013.01); *F02B 37/16* (2013.01); *F02B 37/18* (2013.01); *F02B 39/10* (2013.01); *F02D 41/10* (2013.01); *F02D 2200/602* (2013.01); *Y02T 10/144* (2013.01); *Y02T 10/47* (2013.01)

(58) Field of Classification Search
  CPC ....... Y02T 10/144; F02B 37/04; F02B 39/10; F02B 37/16; F02B 29/0475; F02D 41/0007; F02D 23/00; F02M 25/0711
  USPC .............. 60/609, 605.1, 612; 123/559.1, 562, 123/564
  See application file for complete search history.

(56) References Cited

U.S. PATENT DOCUMENTS

| 4,502,283 | A | * | 3/1985 | Wandel ........................... 60/609 |
| 5,186,005 | A |   | 2/1993 | Yoshioka et al. |
| 5,335,500 | A | * | 8/1994 | Wunderlich et al. ............ 60/609 |
| 5,771,868 | A | * | 6/1998 | Khair ........................ 123/568.12 |
| 6,209,324 | B1 |  | 4/2001 | Daudel et al. |
| 6,637,205 | B1 |  | 10/2003 | Ahmad et al. |
| 6,647,724 | B1 |  | 11/2003 | Arnold et al. |
| 7,287,379 | B2 |  | 10/2007 | Gobert et al. |

(Continued)

OTHER PUBLICATIONS

Ahrns, Chris C., "Direct Manifold Boost Assist Device with Throttle Body Manifold Volume Isolation," U.S. Appl. No. 13/863,186, filed Apr. 15, 2013, 50 pages.

*Primary Examiner* — Thomas Denion
*Assistant Examiner* — Thomas Olszewski
(74) *Attorney, Agent, or Firm* — Julia Voutyras; Alleman Hall McCoy Russell & Tuttle LLP

(57) ABSTRACT

Methods and systems are provided for adjusting intake airflow through two induction passages. In response to increased torque demand, intake airflow may be directed through a first induction passage including an exhaust-driven turbocharger compressor and through a second induction passage including an electric compressor. Further, after the turbocharger compressor increases speed, intake airflow may be directed again through the first induction passage to further increase boost.

20 Claims, 7 Drawing Sheets

(56) References Cited

U.S. PATENT DOCUMENTS

| | | |
|---|---|---|
| 7,810,328 B2 | 10/2010 | Goebelbecker et al. |
| 8,056,339 B2 | 11/2011 | Lippa et al. |
| 8,069,665 B2 | 12/2011 | Pursifull et al. |
| 8,146,359 B2 | 4/2012 | Currie et al. |
| 8,210,292 B2 | 7/2012 | Russell et al. |
| 8,353,275 B2 | 1/2013 | VanDerWege et al. |
| 8,371,276 B2 | 2/2013 | Pursifull et al. |
| 2004/0194466 A1* | 10/2004 | Kawamura et al. ............. 60/612 |
| 2006/0123786 A1 | 6/2006 | Gobert et al. |
| 2009/0107142 A1* | 4/2009 | Russell et al. ................. 60/608 |
| 2013/0233289 A1* | 9/2013 | Mailander ..................... 123/562 |

\* cited by examiner

DIRECT MANIFOLD BOOST ASSIST DEVICE WITH THROTTLE BODY MANIFOLD VOLUME ISOLATION

BACKGROUND/SUMMARY

Turbocharged engines utilize a turbocharger to compress intake air and increase the power output of the engine. A turbocharger may use an exhaust-driven turbine to drive a compressor which compresses intake air. As the speed of the compressor increases, increased boost is provided to the engine. Upon receiving an increased torque demand, it may take an amount of time for the turbine and compressor to speed up and provide the required boost. This delay in turbocharger response, termed turbo lag, may result in a delay in providing the demanded engine power. The volume of the induction system of the engine may also delay the time to pressurize that volume of air. As such, turbo lag and increased induction system volume may result in engine torque response delays.

Other attempts to address turbo lag and engine torque response delays include including an electric assist compressor on the primary induction passage. While the electric compressor may provide extra boost, the electric compressor still has to pressurize the entire induction system volume of air, thereby delaying torque response. Another method to reduce engine torque response delays includes utilizing a dual turbocharger arrangement in which two turbochargers are arranged in parallel or in series along the induction path. While the addition of a second turbocharger may reduce turbo lag, this may also increase the size and cost of the engine system.

In one example, the issues described above may be addressed by a method for controlling intake airflow through two induction flow passages of an engine. A first flow passage may include a turbine-driven compressor and a second flow passage may include an electric compressor. Upon receiving an increased torque request, the electric compressor on the second flow passage may provide increased boost to an intake manifold of the engine.

In one example, in response to a driver tip-in, a throttle in a first induction flow passage, downstream of an exhaust-driven turbocharger compressor, may be temporarily opened. At the same time, an electric compressor may be driven to also drive flow into an intake manifold through a second induction flow passage, the second flow passage coupled between the first induction flow passage, downstream of a charge air cooler, and the intake manifold. Specifically, the throttle may be fully opened and the electric compressor may be turned on in response to the tip-in, or increased torque demand. Once manifold pressure increases to atmospheric pressure, the throttle may be closed and a compressor recirculation valve may be opened while continuing driving of the electric compressor to provide boosted air to the intake manifold. During this time, the turbine-driven compressor may increase speed, thereby increasing boost pressure in the first induction passage. In response to boost pressure increasing above the manifold pressure, the throttle may open and the compressor recirculation valve may close to provide the required boost. In this way, turbo lag may be reduced, thereby decreasing the delay in engine torque response.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
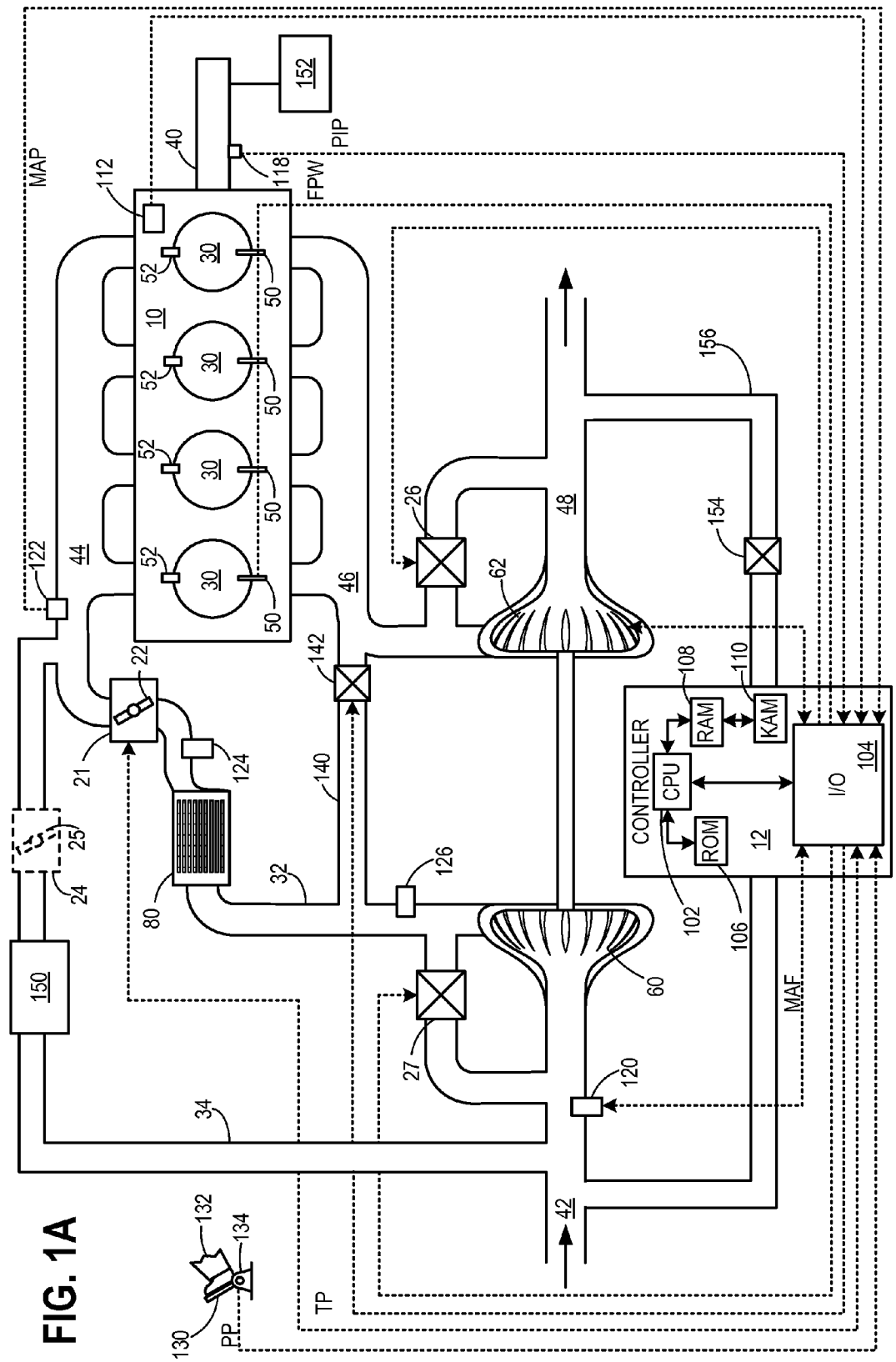
FIG. 1A is a schematic diagram of an example engine system including a first induction flow passage and a first embodiment of a second induction flow passage.
Figure 1B:
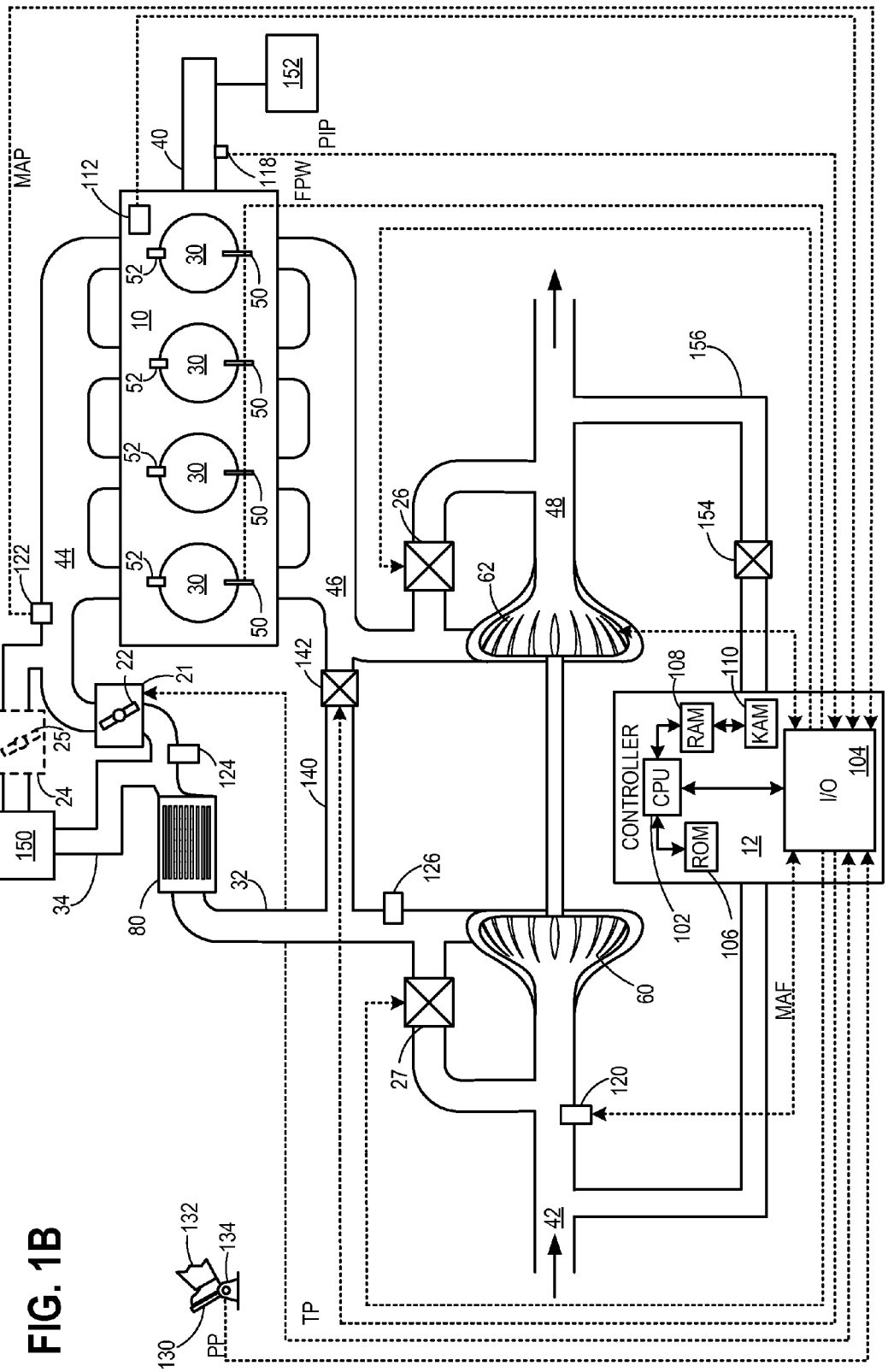
FIG. 1B is a schematic diagram of an example engine system including a first induction flow passage and a second embodiment of a second induction flow passage.
Figure 2:
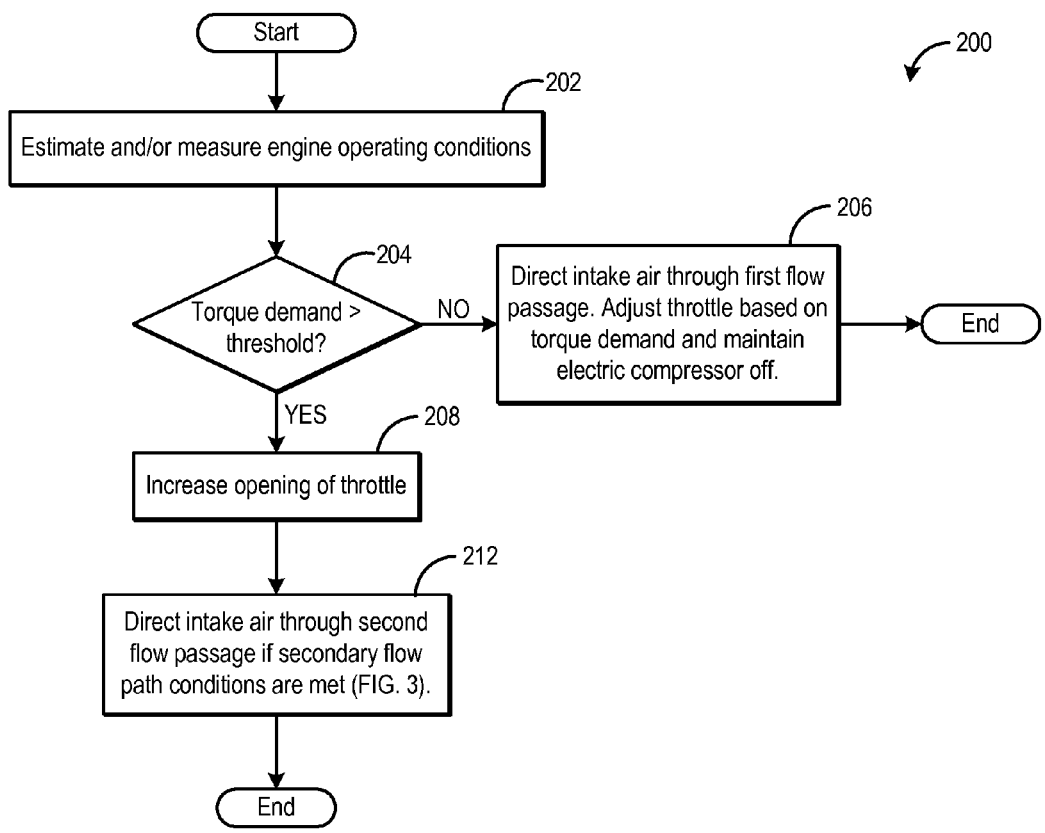
FIGS. 2, 3, and 5 are flow charts of methods for adjusting intake airflow through first and second induction flow passages in response to engine operating conditions.
Figure 3:
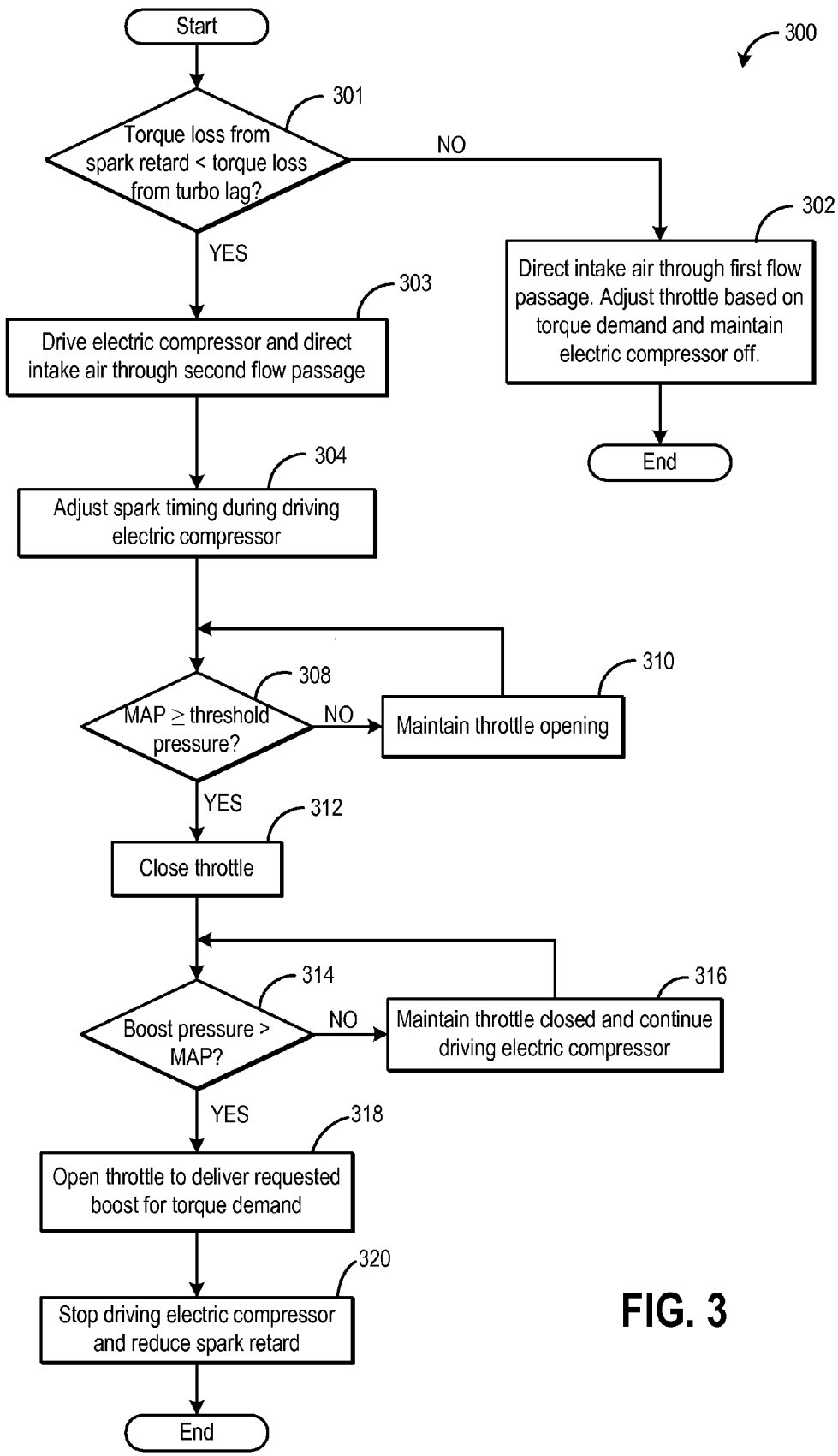
Figure 4:
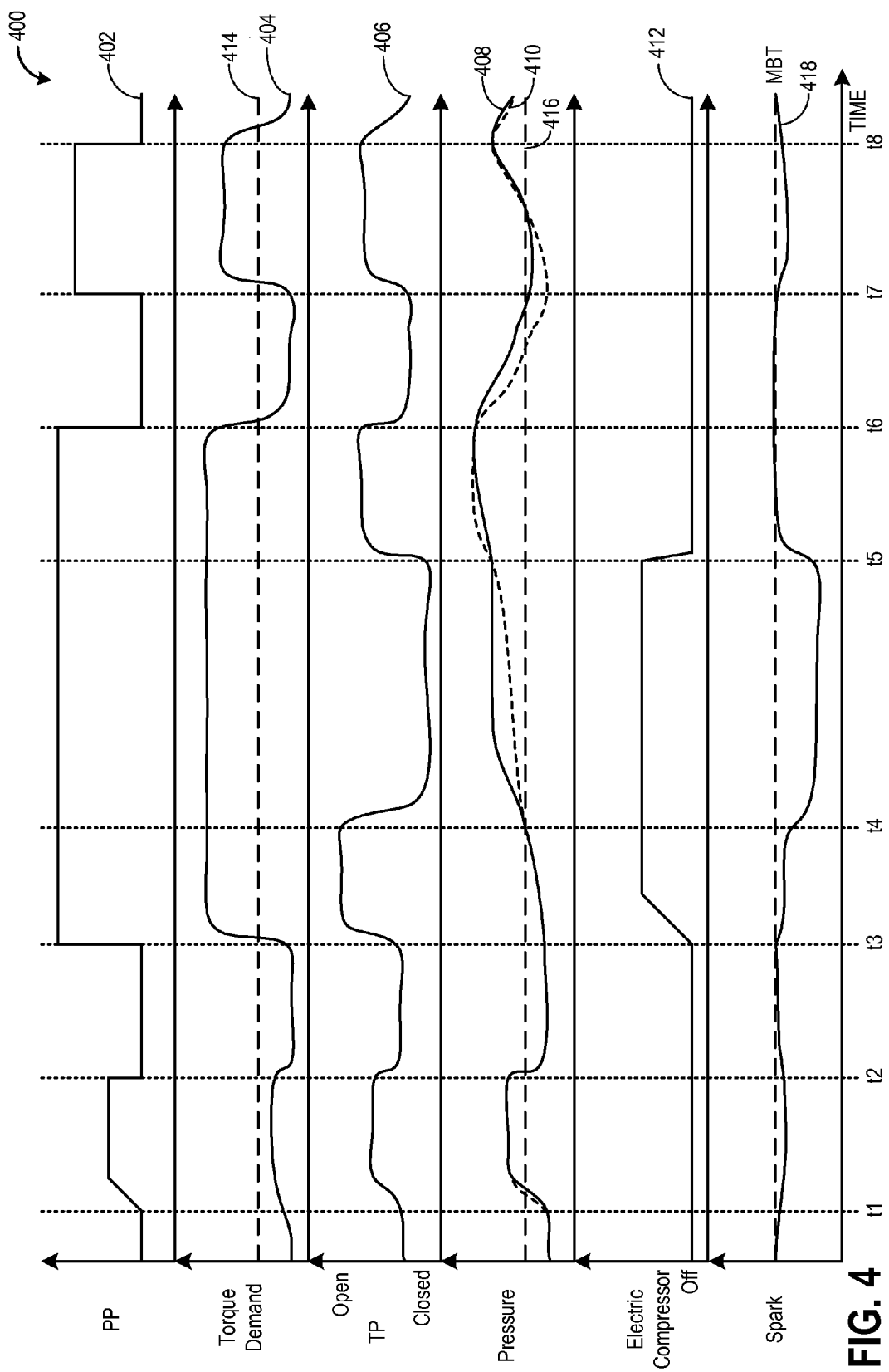
FIG. 4 is a graphical example of throttle and electric compressor adjustments in response to engine operating conditions.
Figure 5:
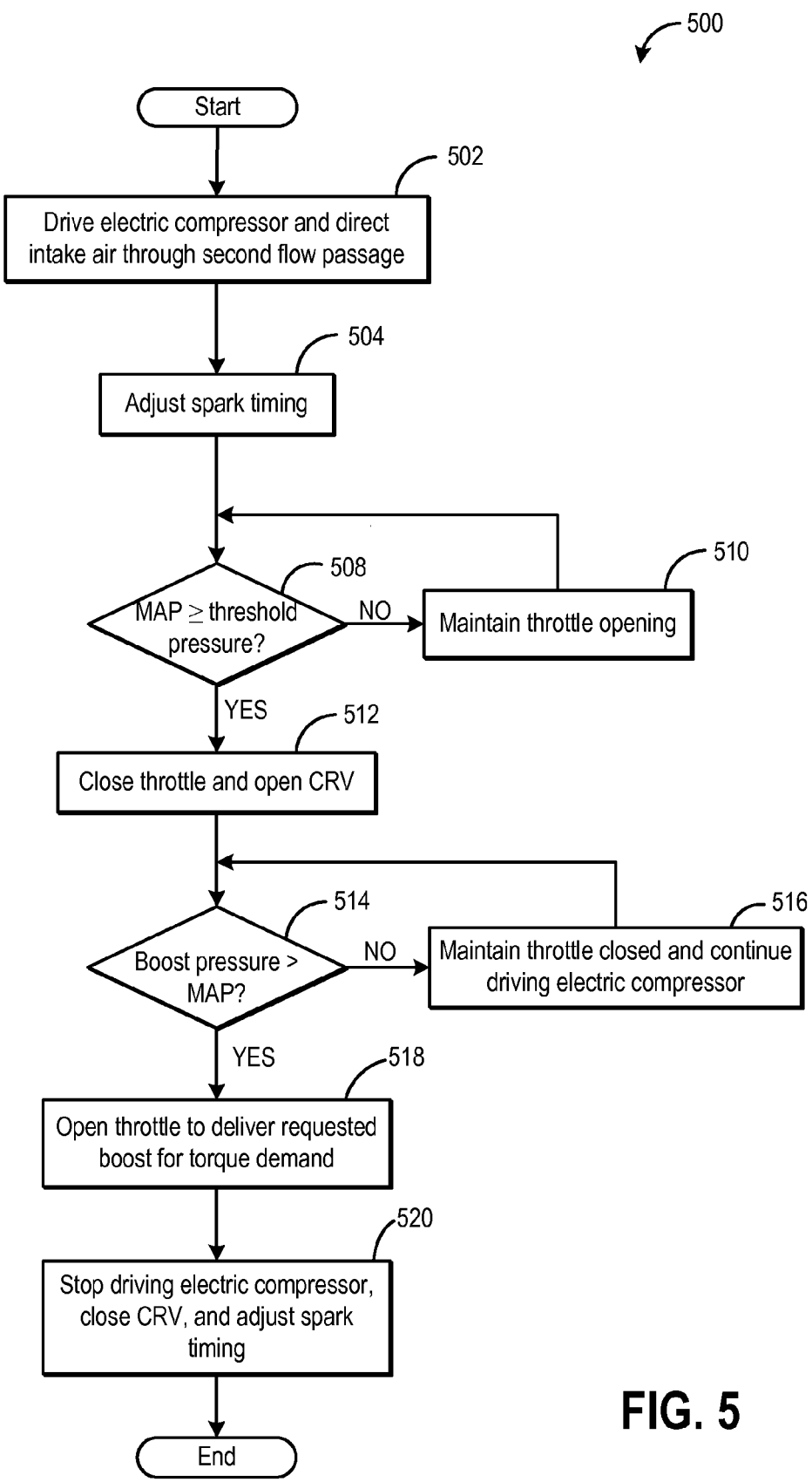
Figure 6:
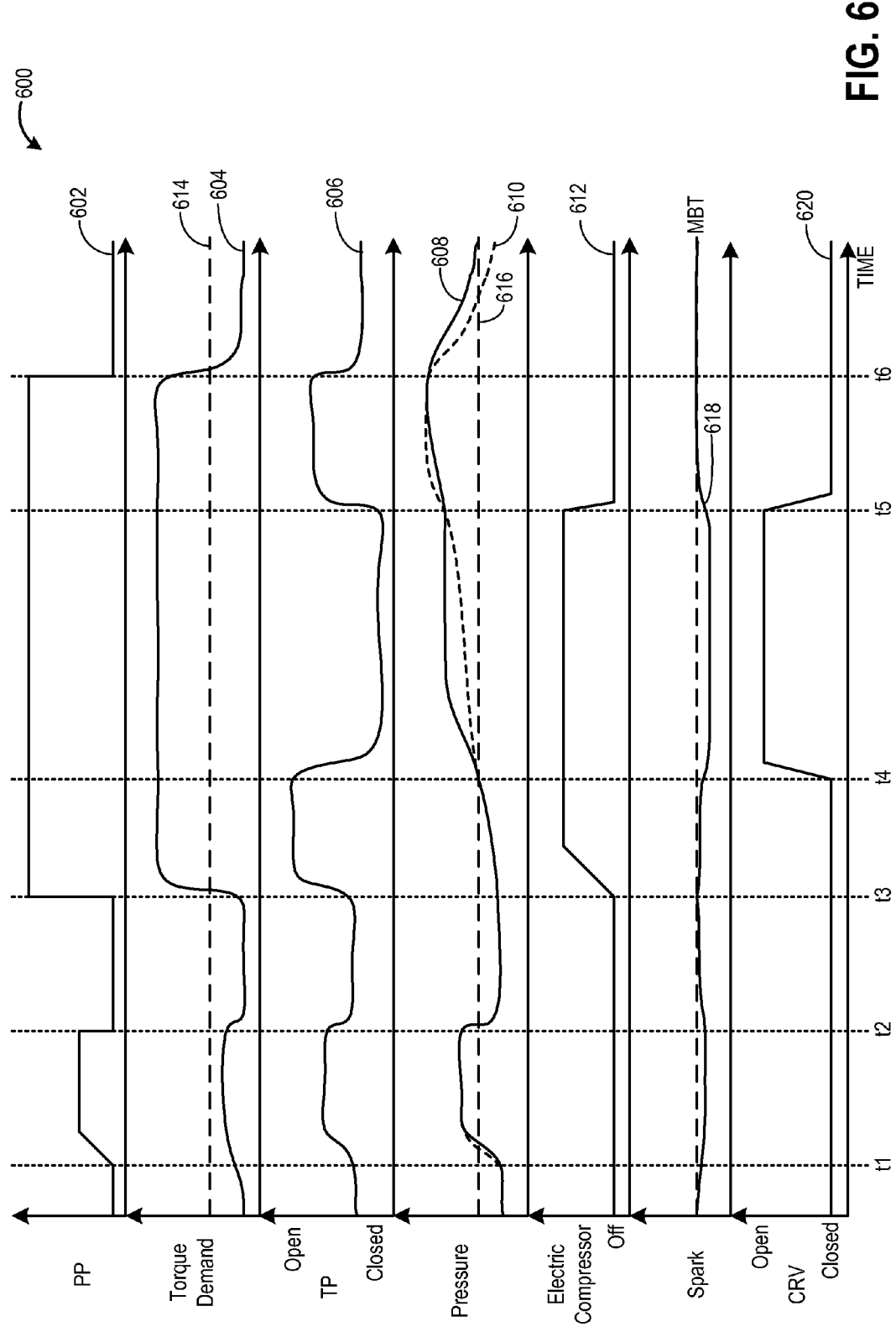
FIG. 6 is a graphical example of throttle, electric compressor, and compressor recirculation valve adjustments in response to engine operating conditions.

The following description relates to systems and methods for adjusting a flow of intake air through two induction flow passages. An engine system, such as the engine system shown in FIGS. 1A-1B, may include a first induction flow passage with a turbine-driven compressor and a second induction flow passage with an electric compressor. In one example, as shown in FIG. 1A, the second induction flow passage may be parallel with the first induction flow passage, the second flow passage coupled between an intake passage, upstream of the turbine-driven compressor, and an intake manifold. In another example, as shown in FIG. 1B, the second induction flow passage may be coupled between the first induction flow passage, downstream of a charge air cooler and upstream of a throttle, and the intake manifold. Flow through the first and second induction passages may be controlled by adjusting a position of a throttle in the first induction passage and operation of the electric compressor. FIGS. 2, 3, and 5 illustrate methods for adjusting the throttle, compressor recirculation valve, and electric compressor to drive airflow through the first and second induction flow passages in response to driving and engine operating conditions. FIGS. 4 and 6 show example electric compressor and throttle adjustments in response to torque demand, manifold pressure, and boost pressure.

FIG. 1A and FIG. 1B are schematic diagrams showing an example engine 10, which may be included in a propulsion system of an automobile. The engine 10 is shown with four cylinders or combustion chambers 30. However, other numbers of cylinders may be used in accordance with the current disclosure. Engine 10 may be controlled at least partially by a control system including a controller 12, and by input from a vehicle operator 132 via an input device 130. In this example, the input device 130 includes an accelerator pedal and a pedal position sensor 134 for generating a proportional pedal position signal PP. Each combustion chamber (e.g., cylinder) 30 of the engine 10 may include combustion chamber walls with a piston (not shown) positioned therein. The pistons may be coupled to a crankshaft 40 so that reciprocating motion of the piston is translated into rotational motion of the crankshaft. The crankshaft 40 may be coupled to at least one drive wheel of a vehicle and use engine output torque to propel the automobile. The crankshaft 40 may also be used to drive an alternator 152. The alternator 152 may be used to charge and/or power an electric compressor 150. As elaborated herein, the controller 12 may actuate the operation of the electric compressor 150. The electric compressor 150 may then be driven using stored charge or power from the alternator 152.

The combustion chambers 30 may receive intake air from the intake manifold 44 and may exhaust combustion gases via an exhaust manifold 46 to an exhaust passage 48. The intake manifold 44 and the exhaust manifold 46 can selectively communicate with the combustion chamber 30 via respective intake valves and exhaust valves (not shown). In some embodiments, the combustion chamber 30 may include two or more intake valves and/or two or more exhaust valves.

Fuel injectors 50 are shown coupled directly to the combustion chamber 30 for injecting fuel directly therein in proportion to the pulse width of signal FPW received from controller 12. In this manner, the fuel injector 50 provides what is known as direct injection of fuel into the combustion chamber 30; however it will be appreciated that port injection is also possible. Fuel may be delivered to the fuel injector 50 by a fuel system (not shown) including a fuel tank, a fuel pump, and a fuel rail.

In a process referred to as ignition, the injected fuel is ignited by known ignition means such as spark plug 52, resulting in combustion. Spark ignition timing may be controlled such that the spark occurs before (advanced) or after (retarded) the manufacturer's specified time. For example, spark timing may be retarded from maximum break torque (MBT) timing to control engine knock or advanced under high humidity conditions. In particular, MBT may be advanced to account for the slow burn rate. In one example, spark may be retarded during a tip-in. As discussed further below, spark timing may also be retarded from MBT to reduce knock when directing warmer intake air through a second induction flow passage 34 and the intake manifold 44.

The intake manifold 44 may receive intake air from a first induction flow passage 32 (e.g., first flow passage) and/or a second induction flow passage 34 (e.g., second flow passage). The intake passage 42 may supply air to both of these passages. FIG. 1A shows a first embodiment of the second induction flow passage 34 while FIG. 2A shows a second embodiment of the second induction flow passage 34. These two embodiments of the second induction flow passage are described further below.

The first flow passage 32 connects to the intake passage 42 upstream of an exhaust-driven turbocharger compressor (e.g., compressor) 60. The first flow passage 32 connects to the intake manifold 44 downstream of a throttle 21. Thus, the first flow passage 32 includes the throttle 21 having a throttle plate 22 to regulate flow through the first flow passage 32 and into the intake manifold 44. In this particular example, the position (TP) of the throttle plate 22 may be varied by the controller 12 to enable electronic throttle control (ETC). In this manner, the throttle 21 may be operated to vary the intake air provided from the first flow passage 32 to the combustion chambers 30. For example, the controller 12 may adjust the throttle plate 22 to increase an opening of the throttle 21. Increasing the opening of the throttle 21 may increase the amount of air supplied to the intake manifold 44. In an alternate example, the opening of the throttle 21 may be decreased or closed completely to shut off airflow from the first flow passage 32 to the intake manifold 44. In some embodiments, additional throttles may be present in intake passage 42, such as a throttle upstream of the compressor 60 (not shown).

Further, in the disclosed embodiments, an exhaust gas recirculation (EGR) system may route a desired portion of exhaust gas from the exhaust passage 48 to the first flow passage 32 via an EGR passage, such as high pressure EGR passage 140. The amount of EGR provided to the intake passage 42 may be varied by the controller 12 via an EGR valve, such as high pressure EGR valve 142. Under some conditions, the EGR system may be used to regulate the temperature of the air and fuel mixture within the combustion chamber. FIGS. 1A-1B show a high pressure EGR system where EGR is routed from upstream of a turbine of a turbocharger to downstream of a compressor of a turbocharger through EGR passage 140. FIGS. 1A-1B also show a low pressure EGR system where EGR is routed from downstream of turbine of a turbocharger to upstream of a compressor of a turbocharger through low pressure EGR passage 156. A low pressure EGR valve 154 may control the amount of EGR provided to the intake passage 42. In some embodiments, the engine may include both a high pressure EGR and a low pressure EGR system, as shown in FIGS. 1A-1B. In other embodiments, the engine may include either a low pressure EGR system or a high pressure EGR system. When operable, the EGR system may induce the formation of condensate from the compressed air, particularly when the compressed air is cooled by the charge air cooler, as described in more detail below.

The engine 10 may further include a compression device such as a turbocharger or supercharger including at least a compressor 60 arranged along the first flow passage 32. For a turbocharger, the compressor 60 may be at least partially driven by a turbine 62, via, for example a shaft, or other coupling arrangement. The turbine 62 may be arranged along the exhaust passage 48. Various arrangements may be provided to drive the compressor. For a supercharger, the compressor 60 may be at least partially driven by the engine and/or an electric machine, and may not include a turbine. Thus, the amount of compression provided to one or more cylinders of the engine via a turbocharger or supercharger may be varied by the controller 12.

In the embodiment shown in FIGS. 1A-1B, the compressor 60 may be driven primarily by the turbine 62. The turbine 62 may be driven by exhaust gases flowing through the exhaust passage 48. Thus, the driving motion of the turbine 62 may drive the compressor 60. As such, the speed of the compressor 60 may be based on the speed of the turbine 62. As the speed of the compressor 60 increases, more boost may be provided through the first flow passage 32 to the intake manifold 44.

Further, the exhaust passage 48 may include a wastegate 26 for diverting exhaust gas away from the turbine 62. Additionally, the intake passage 42 may include a compressor bypass or recirculation valve (CRV) 27 configured to divert intake air around the compressor 60. The wastegate 26 and/or the CRV 27 may be controlled by the controller 12 to be opened when a lower boost pressure is desired, for example.

The first flow passage 32 may further include a charge air cooler (CAC) 80 (e.g., an intercooler) to decrease the temperature of the turbocharged or supercharged intake gases. In some embodiments, the CAC 80 may be an air to air heat exchanger. In other embodiments, the CAC 80 may be an air to liquid heat exchanger. The CAC 80 may also be a variable volume CAC. Hot charge air (boosted air) from the compressor 60 enters the inlet of the CAC 80, cools as it travels through the CAC, and then exits to enter the engine intake manifold 44. Ambient air flow from outside the vehicle may enter engine 10 through a vehicle front end and pass across the CAC, to aid in cooling the charge air.

Thus, the first flow passage 32 includes the compressor 60, the CAC 80, and the throttle 21. The first flow passage 32 has a first air induction volume (e.g., first volume) which includes the air volume of the compressor 60, the air volume of the CAC 80, and the air volume of the flow path tubing. This air induction volume of the first flow passage 32 may delay the time it takes to pressurize the first volume of induction air. As a result, it may take a duration to supply boosted air to the intake manifold 44. Further, if a large torque demand requires increased boost, it make take additional time for the compressor to increase to a speed which produces the required boost. As a result, torque output may be reduced until the turbocharger speeds up, thereby resulting in turbo lag.

In the embodiment shown in FIG. 1A, the second flow passage 34 connects to the intake passage 42 upstream of the compressor 60 (e.g., turbine-driven compressor) and connects to the intake manifold downstream of the throttle 21. As such, the second flow passage 34 is parallel to the first flow passage 32. In an alternate embodiment, as shown in FIG. 1B, the second flow passage 34 is coupled between the first flow passage 32, downstream of the CAC 80 and upstream of the throttle 21, and the intake manifold 44, downstream of the throttle 21. As such, the inlet to the second flow passage 32 is downstream from the CAC 80 and the compressor 60 rather than upstream of the compressor 60, as shown in FIG. 1A. In the embodiment shown in FIG. 1B, cooled charge air may be pulled into the second flow passage 34 and to the intake manifold 44. In yet another embodiment, the second flow passage 34 may instead connect to the first flow passage 32, upstream of the CAC 80, and then connect to the intake manifold 44 downstream of the throttle 21.

The second flow passage 34 includes a boosting element. In the embodiment shown in FIGS. 1A-1B, the boosting element is an electric compressor 150. In an alternate embodiment, the boosting element may be another type of driving element such as an air pressure, hydraulic, gear, chain, or belt element driven from the engine. The electric compressor 150 may be used to boost intake air and supply the boosted air to the intake manifold 44. As described above, the electric compressor may be powered by stored energy provided by an alternator or other power source. The controller 12 may actuate operation of the electric compressor 150, including turning the electric compressor on, off, and adjusting a speed of the electric compressor. The speed of the electric compressor 150 may be based on a torque request. As elaborated herein, the electric compressor 150 may be operated to control boosted airflow through the second flow passage 34 in response to engine operating conditions such as boost pressure, intake manifold pressure (MAP), and torque demand.

In one example, the electric compressor 150 may be used to increase or decrease flow through the second flow passage 34. For example, when the electric compressor 150 is off (e.g., not spinning), no intake airflow may enter and flow through the second flow passage 34 to the intake manifold 44. Thus, air may only flow through the second flow passage 34 when the electric compressor 150 is on and being driven by the controller 12. As the speed of the electric compressor 150 increases, the amount of airflow and boost delivered to the intake manifold through the second flow passage 34 may increase. In some embodiments, the second flow passage may have an optional throttle 24 having a throttle plate 25 to regulate airflow through the second flow passage 34 and into the intake manifold 44. In this particular example, the position of the throttle plate 25 may be varied by the controller 12. In this manner, the throttle 24 may be operated to vary the amount of intake air provided from the second flow passage 34 to the intake manifold 44. For example, the controller 12 may adjust the throttle plate 25 to increase an opening of the throttle 24. Increasing the opening of the throttle 21 may increase the amount of air supplied to the intake manifold 44. In an alternate example, the opening of the throttle 24 may be decreased or closed completely to shut off airflow from the second flow passage 34 to the intake manifold 44. Alternatively, throttle 24 may be replaced with a one-way valve, allowing a maximum amount of flow into the intake manifold 44, but not allowing induction air in the first flow passage 32 to escape upstream through the second flow passage 34 when the electric compressor 150 is not being operated.

In alternate embodiments, the second flow passage 34 may include a charge air cooling element, such as a charge air cooler, positioned downstream from the electric compressor 150. The charge air cooler in the second flow passage 34 may cool the electrically boosted charge air before it enters the intake manifold 44. The charge air cooler may be an air-to-air charge air cooler or a water-to-air charge air cooler.

The second flow passage 34 has a second air induction volume (e.g., second volume) which includes the air volume of the electric compressor 150 and the air volume of the flow path tubing. The second air induction volume may be smaller in the embodiment shown in FIG. 1B than the embodiment shown in FIG. 1A. Further, FIGS. 1A-1B may not be drawn to scale. As such, the second flow passage 34 may be shorter than it appears in FIGS. 1A-1B with relation to the first flow passage 32. Additionally, the electric compressor 150 may be positioned proximate to the intake manifold 44 in order to further reduce the air charge and induction volume.

The second volume of the second flow passage 34 may be smaller than the first volume of the first flow passage 32. As such, the second flow passage 34 may provide boosted air to the intake manifold 44 more quickly than the first flow passage 32. As described further below with reference to FIGS. 2-3, the controller may adjust the position of the throttle 21 and operation of the electric compressor 150 to control airflow through the first and second flow passages. In this way, increased boost may be supplied more quickly in response to an increased torque demand, thereby reducing turbo lag.

The controller 12 is shown in FIGS. 1A-1B as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to the engine 10 for performing various functions to operate the engine 10. In addition to those signals previously discussed, these signals may include measurement of inducted mass air flow from MAF sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by the controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, the Hall effect sensor 118, which is also used as an engine speed sensor, may produce a predetermined number of equally spaced pulses every revolution of the crankshaft 40.

Other sensors that may send signals to controller 12 include a temperature sensor 124 at an outlet of a charge air cooler 80, and a boost pressure sensor 126. Other sensors not depicted may also be present, such as a sensor for determining the intake air velocity at the inlet of the charge air cooler, and other sensors. In some examples, storage medium read-only memory chip 106 may be programmed with computer readable data representing instructions executable by microprocessor unit 102 for performing the methods described below as well as other variants that are anticipated but not specifically listed. Example routines are described herein at FIGS. 2-3.

The system of FIG. 1A provides for an engine system including an induction system with two parallel flow passages to an intake manifold of the engine. A first flow passage may include a throttle and a turbine-driven compressor. A second flow passage, parallel to the first flow passage, may include an electric compressor. Specifically, the second flow passage may be coupled between an intake passage, upstream of the turbine-driven compressor, and the intake manifold. The engine system may further include a controller with computer readable instructions for adjusting intake airflow through the first flow passage and the second flow passage in response to driving conditions. In one example, driving conditions may include a tip-in and/or torque demand above or below a threshold.

The system of FIG. 1B provides for an engine system including an induction system with two flow passages to an intake manifold of the engine. A first flow passage may include a throttle, a charge air cooler, a turbine-driven compressor, and a compressor recirculation valve operable to direct airflow around the turbine-driven compressor. A second flow passage, coupled between the first flow passage, downstream of the charge air cooler, and the intake manifold, may include an electric compressor. The engine system may further include a controller with computer readable instructions for adjusting intake airflow through the first flow passage and the second flow passage in response to driving conditions. In one example, driving conditions may include a tip-in and/or torque demand above or below a threshold.

As described above, the intake manifold of the engine may receive intake air through two induction passages. The first flow path or passage may include an exhaust-driven turbocharger compressor (e.g., driven by turbine) and an intake throttle. The second flow path or passage may include an electric compressor. A controller may adjust a position of the intake throttle and operation the electric compressor to adjust airflow through the first and second flow passages. For example, the controller may increase an opening of the intake throttle to increase an amount of airflow through the first flow passage. Alternatively, the controller may decrease the opening of the intake throttle, increase an opening of the compressor recirculation valve (CRV), and/or actuate operation of the electric compressor to increase an amount of airflow through the second flow passage. In one example, the controller may close the throttle and actuate operation of the electric compressor so that all the intake air travels through the second flow passage. In another example, the controller may open the throttle and stop operation of the electric compressor so that all the intake air travels through the first flow passage. In yet another example, the controller may partially open the throttle while operating the electric compressor, thereby allowing intake air to flow through both the first flow passage and the second flow passage.

Additionally, in the embodiment shown in FIG. 1B, the controller may increase an opening of the CRV when closing the throttle and directing airflow through the second flow passage. In one example, increasing an opening of the CRV may include fully opening the CRV. In another example, increasing an opening of the CRV may include opening the CRV if the CRV is closed. Opening the CRV upon closing the throttle allows airflow to flow from the intake passage (e.g., intake passage 42 shown in FIG. 1B), through the CRV, into the first flow passage, upstream of the second flow passage, and into the second flow passage. While the CRV is open and intake air is traveling through the second flow passage, the turbine may be driving the compressor on the first flow passage. The controller may then decrease the opening of the CRV upon re-opening the throttle.

The flow of intake air through the first and/or second flow passages may be controlled in response to engine operating conditions. In one example, the electric compressor may normally be off and little to no intake air may flow through the second flow passage. Thus, intake air may flow through the first flow passage to the intake manifold. The controller may adjust the position of the throttle to increase or decrease the throttle opening in order to increase or decrease the mass air flow to the engine. Additionally, increasing speed of the compressor may increase the boost pressure and MAP of the air entering the intake manifold of the engine. As such, as turbine and compressor speed increase, the amount of boost delivered to the intake manifold may also increase. At higher engine torque demand, increased mass air flow and boost may be requested. Thus, the throttle may be controlled in response to a torque request to supply the required mass air flow for the torque demand. In some cases, the compressor may not be spinning fast enough to instantaneously supply the required boost pressure for a given torque request. Thus, there may be a delay between when a torque demand is received and the requested torque is output by the engine. This delay, referred to herein as turbo lag, may result from the amount of time it takes the compressor to increase speed and supply the required boost.

In some embodiments, the electric compressor of the second flow passage may be used to supply boost to the engine. For example, in response to torque demand over a threshold level, the electric compressor may be operated to supply boosted intake air to the intake manifold. The threshold level may be based on the current turbine-driven compressor speed and the amount of boost required for the torque demand. In one example, the threshold level may decrease for a lower compressor speed and higher requested boost level. In another example, the threshold level may be a pre-set level based on the turbocharger. In some examples, a torque demand over a threshold level may include a tip-in, as indicated by an increase in pedal position and/or throttle position.

The controller may adjust flow through the first and the second flow passages to supply the requested boost as quickly as possible. Specifically, upon receiving a torque demand greater than a threshold level, the controller may increase the opening of the throttle (e.g., throttle 21 shown in FIGS. 1A-1B) to direct increased airflow through the first flow passage. At the same time, the controller may turn on and drive the electric compressor to direct intake air through the second flow passage. The electric compressor may supply boost to the engine intake, thereby allowing torque output to increase. Once the manifold pressure (e.g., MAP) is at, or greater than, atmospheric pressure, the throttle may be closed, thereby cutting off airflow through the first flow passage. The electric compressor may continue to supply boost to the engine intake. At the same time, the turbine-driven compressor may be increasing speed as the turbine speed increases. As the compressor spins faster, boost pressure may increase. When boost pressure increases above MAP, the controller may re-open the throttle to direct airflow through the first flow passage and deliver the required boost for the torque demand.

The throttle (e.g., throttle 21 shown in FIGS. 1A-1B) may be opened at a controlled rate in order to provide a relatively constant mass air flow transition to the intake manifold. At this time, the controller may stop operation of the electric compressor, thereby decreasing airflow through the second flow passage. Directing airflow through the two flow passages in this way may decrease the time it takes to deliver boost for an increased torque request, thereby reducing turbo lag. Further details on these adjustments are presented below with regard to FIGS. 2-3.

In the embodiment where the second flow passage is coupled between the first flow passage, downstream of the CAC, and the intake manifold (as shown in FIG. 1B), the controller may additionally adjust the opening of the CRV. For example, when the throttle closes in response to the MAP being greater than atmospheric pressure, the controller may also open the CRV. This allows increased airflow to travel to the second flow passage and the electric compressor. While the second flow passage is supplying boost to the engine intake, the turbine-driven compressor may be increasing speed as the turbine speed increases. Little to no load may be on the turbine-driven compressor, thereby allowing the speed of the turbine-driven compressor to increase at a faster rate. As such, the throttle may then be re-opened soon than if the CRV remained closed during this time. When the controller re-opens the throttle in response to the boost pressure increasing above MAP, the controller may also close the CRV. Further details on these adjustments are presented at FIGS. 2 and 5.

When transitioning from providing intake airflow through the first flow passage to the second flow passage and the second flow passage to the first flow passage, the controller may adjust the throttle and electric compressor so mass air flow into the intake air flow remains constant and smooth. For example, as discussed above, to transition from providing airflow through the first flow passage to providing airflow through the second flow passage, the controller may close the throttle in the first flow passage and drive the electric compressor on the second flow passage. The closing of the throttle and driving of the electric compressor may be coordinated so that relatively constant mass air flow is provided, at the demanded level, to the intake manifold. For example, the controller may turn on the electric compressor instantly, or by slowly increasing the rotation speed while at the same time gradually closing the throttle on the first flow passage. Additionally, the electric compressor may be turned on before, at, or after the point of closing of the throttle in order to smooth the transition of mass air flow. In this way, the mass air flow level may be maintained at the demanded level.

Additional engine operating conditions may be adjusted depending on which induction flow passage is delivering intake airflow to the intake manifold. For example, if the throttle is closed and no airflow is flowing through the first flow passage, the high pressure EGR valve may be closed so no EGR flows into the first flow passage. If the engine includes a low pressure EGR system, the low pressure EGR valve may opened to increase EGR flow through the low pressure EGR system while the throttle in the first flow passage is closed. Thus, EGR may be provided from the low pressure EGR system to the second flow passage.

Further, spark timing adjustments may be made based on which induction flow passage is providing intake airflow and the resulting temperature of the intake air. For example, the first induction flow passage includes a CAC to cool compressed air before it enters the intake manifold. This decreases the temperature of the air entering the engine cylinders, thereby reducing engine knock. However, the second flow passage may not include a cooling element such as a CAC. Further, as shown in the embodiment in FIG. 1A, the second flow passage may direct un-cooled intake air to the intake manifold. Thus, the intake air exiting the second flow passage and entering the intake manifold may be warmer than the intake air exiting the first flow passage. Warmer intake air entering the engine cylinders may result in knock. Therefore, under conditions when the second induction flow passage provides intake airflow to the engine cylinders, spark timing may be retarded to reduce knock. Alternatively, when intake airflow is directed through the first induction flow passage, spark timing may be maintained or retarded less than when intake airflow is directed through the second induction flow passage.

As discussed above and shown in FIG. 1B, the inlet to the second flow passage may be coupled to the first flow passage, downstream from the CAC. In this embodiment, spark timing may be retarded less or maintained since the charge air may already be partially cooled. In alternate embodiments, the second flow passage may also include a charge air cooler or other means of cooling the charge air after passing through the electric compressor. In this example, spark timing adjustments may not be necessary. Thus, spark timing adjustments may depend on the configuration of the second flow passage and subsequently the amount of cooling provided to the charge air.

Retarding spark timing may result in an amount of torque loss. As spark is retarded further, the amount of torque loss may increase. Thus, directing airflow through the second flow passage may result in torque loss due to retarding spark to avoid knock. However, directing airflow through the first flow passage may also result in torque loss due to turbo lag. For example, torque loss may result from the amount of time it takes the turbine-driven compressor to speed up to deliver the required boost. In some cases, the torque loss from retarding spark may be greater than the torque loss from turbo lag. Under these conditions, airflow may be directed through the first flow passage instead of the second flow passage, even if torque demand is greater than the threshold level. Methods for adjusting intake airflow through the first and second flow passages based on torque loss is discussed further below with reference to FIGS. 2-3 and 5.

In this way, in response to a driver tip-in, a throttle in a first induction flow passage, downstream of an exhaust-driven turbocharger compressor, may be temporarily opened. In one example, the driver tip-in may be indicated by an increase in pedal position. Additionally, in response to the driver tip-in, an electric compressor may be electrically driven to drive flow into an intake manifold through a second induction flow passage. In one example, the second induction flow passage may be in parallel with the first induction flow passage. In another example, the second induction flow passage may be coupled between the first induction flow passage, downstream of a charge air cooler, and the intake manifold.

In one example, temporarily opening the throttle includes opening the throttle to a threshold opening and maintaining the threshold opening to increase a manifold pressure from below a threshold pressure to the threshold pressure. A controller may then close the throttle in response to the manifold pressure increasing to the threshold pressure. In one example, the controller additionally opens a compressor recirculation valve in response to the manifold pressure increasing to the threshold pressure. The threshold pressure may be atmospheric pressure.

Electrically driving the electric compressor includes driving the electric compressor at a speed based on a required boost level for a torque demand during the tip-in. The throttle may be re-opened in response to a boost pressure being greater than a manifold pressure. Upon re-opening the throttle, the controller may stop electrically driving the electric compressor. In one embodiment, the controller may additionally close the compressor recirculation valve upon re-opening of the throttle. In another example, re-opening the throttle may be responsive to a power level of the electric compressor decreasing below a threshold level. Further, spark retard may be increased during the driving the electric compressor to drive flow into the intake manifold through the second induction flow passage.

FIG. 2 shows a method 200 for determining which induction flow passage to direct intake air through and to the intake manifold. The method begins at 202 by estimating and/or measuring engine operating conditions. Engine operating conditions may include engine speed and load, pedal position (PP), torque demand, spark timing, throttle position, MAP, boost pressure, mass air flow, etc. At 204, the method includes determining if torque demand is greater than a threshold level. In one example, an increase in torque demand may be indicated by an increase in throttle position and/or pedal position. In another example, a torque demand greater than a threshold level may result from a driver tip-in. The driver tip-in may be indicated by a sudden increase in pedal position. Further, the threshold level may be based on a torque demand that may result in turbo lag. For example, it may take a duration for the turbine-driven compressor to produce the required boost for the threshold level of torque demand. This duration may result in a delay in torque output of the engine. As such, the threshold level may be further based on a current compressor speed and/or boost pressure.

Returning to 204, if the torque demand is not greater than the threshold, the controller may direct intake air through the first flow passage at 206. Directing airflow through the first flow passage may include adjusting throttle position based on the torque demand. Further, the controller may maintain the electric compressor off at 206 so most or all of the intake air travels through the first flow passage. In one example, the second flow passage may include a throttle or one-way valve which is closed to block air from flowing through the second flow passage. Alternatively, if torque demand is greater than a threshold at 204, the method continues on to 208 to increase the opening of the throttle (e.g., the throttle in the first flow passage). In one example, this may include opening the throttle to a threshold opening. The threshold opening may be a maximal amount of opening such that the throttle is fully opened. Increasing the opening of the throttle at 208 may result in an increase in mass air flow and MAP.

At 212, the controller directs intake air through the second flow passage if secondary flow path conditions are met. As described further at FIG. 3, these conditions may include a torque loss from spark retard being less than a torque loss from turbo lag. In a first example, as presented further at FIG. 3, directing intake air through the second flow passage may include closing the intake throttle on the first flow passage and driving the electric compressor. In a second example, as presented further at FIG. 5, directing intake air through the second flow passage may include closing the intake throttle and opening the CRV on the first flow passage and driving the electric compressor.

FIG. 3 shows a method 300 for adjusting intake airflow through the first and second flow passages (such as the first and second flow passages 32 and 34, respectively, shown in FIG. 1A) in response to engine operating conditions. Specifically, method 300 continues on from method 200 to direct airflow through a first embodiment of the second flow passage, as shown in FIG. 1A. In this embodiment, directing airflow through the second flow passage includes flowing intake air from upstream of the turbine-driven compressor, through the second flow passage, and to the intake manifold.

Airflow may be directed through the second flow passage when torque demand increases above a threshold level (as described at 204 in method 200) and the secondary flow path conditions are met. As described above, the secondary flow path conditions may include when an expected torque loss from spark retard is less than an expected torque loss from turbo lag. As such, at 301 the method includes determining if the torque loss from spark retard is less than the torque loss from turbo lag. The torque loss from spark retard may be the resulting torque loss due to retarding spark to reduce knock while directing warmer air through the second flow passage. The torque loss from turbo lag may be the resulting torque loss due to directing airflow through the first flow passage and waiting for the turbine-driven compressor to produce the required boost for the torque demand. If the torque loss from retarding spark is not less than the torque loss due to turbo lag (e.g., torque loss from spark retard is greater than torque loss from turbo lag), the method continues on to 302 to direct airflow through the first flow passage. Thus, even though torque demand is greater than the threshold, intake airflow is directed through the first flow passage to reduce losses in engine torque output. However, if at 301 the torque loss from spark retard is less than the torque loss from turbo lag, the controller directs intake air through the second flow passage at 303. Thus, in some examples, the controller may simultaneously open the intake throttle in the first flow passage (as described and direct airflow through the second flow passage to increase boost.

Specifically, at 303, the controller drives the electric compressor and directs intake air through the second flow passage. Driving the compressor at 302 may include turning on the electric compressor and operating the electric compressor at a speed based on a required boost level for the torque demand. For example, the electric compressor may remain off until torque demand and/or pedal position increases above a threshold. At that point, the speed of the electric compressor may increase with increasing torque demand. In another example, the electric compressor may only turn on or off. As such, the electric compressor may only operate at one speed when turned on. In yet another example, the operation speed of the electric compressor may be based on an amount of power stored (e.g., power available) at the electric compressor. For example, if less power is available for electric compressor operation, the electric compressor may be driven at a lower speed than required by the boost level.

After turning on the electric compressor, the controller may adjust spark timing at 304. Spark timing adjustments may be based on a temperature of the charge air traveling through the second flow passage and entering the intake manifold of the engine. For example, in response to driving the electric compressor to direct warmer intake air through the second flow passage, the controller may retard spark timing at 304. The amount of spark retard may be based on the temperature of the air traveling through the second flow passage and/or the driving speed of the electric compressor. For example, for a larger torque demand, the electric compressor may spin at a faster rate to provide increased boost. This may increase the temperature of the intake air entering the engine cylinders, thereby increasing the risk of knock. As a result, spark may be retarded by a larger amount. The controller may continue to adjust spark during the directing intake air through the second flow passage. For example, after closing the throttle (described further below at 312), the controller may increase the amount of spark retard due to an increased amount of warmer air traveling to the intake manifold.

At 308, the method includes determining if MAP is at or above a threshold pressure. In one example, the threshold pressure is atmospheric pressure. In another example, the threshold pressure may be a pressure greater or less than atmospheric pressure. If MAP is still below the threshold pressure at 308, the controller maintains the current throttle opening at 310. Once MAP reaches and/or increases above the threshold pressure, the controller closes the throttle on the first flow passage at 312. Closing the throttle at 312 may include slowly decreasing the opening of the throttle to provide relatively smooth mass air flow to the engine intake. In this way, continuous mass air flow may be provided to the intake manifold.

During the driving the electric compressor, the turbine-driven compressor may be increasing speed. As a result, the boost pressure, downstream of the turbine-driven compressor, may increase. At 314, the method determines if the boost pressure is greater than MAP. If boost pressure is not greater than MAP, the controller continues driving the electric compressor and maintains the throttle closed at 316. However, if the boost pressure is greater than MAP, the method continues on to 318 to open the throttle to deliver the required boost for the torque demand. Upon opening the throttle, the controller stops driving the electric compressor at 320. This may include stopping airflow through the second flow passage. Further, the method at 320 may include returning spark timing to its original or currently requested level. In some embodiments, the steps at 318 and 320 may occur concurrently to provide smooth and continuous mass air flow. In one example, this may include increasing the opening of the throttle while slowing down and eventually stopping the compressor.

Alternatively, if the electric compressor runs out of power before the boost pressure increase above MAP, the throttle may be opened anyway. For example, method 300 may have an extra step after 314 and before 316 which checks the power level of the electric compressor. If the power level of the electric compressor is below a threshold level, the method may continue on to 318 to re-open the throttle, even if boost pressure is not greater than MAP. The electric compressor would then be turned off at 320 so that it may re-charge for subsequent tip-ins.

In this way, a controller may adjust intake airflow through a first flow passage and a second flow passage in response to driving conditions. In one example, adjusting intake airflow includes increasing an opening of the throttle to direct airflow through the first flow passage responsive to a torque demand less than a threshold. In another example, adjusting intake airflow includes initially increasing an opening of the throttle and driving the electric compressor to simultaneously direct airflow through the first flow passage and the second flow passage responsive to a torque demand greater than a threshold. The throttle may then be closed after the initial increase in opening responsive to a manifold pressure greater than atmospheric pressure. Adjusting intake airflow may further include increasing an opening of the throttle and stopping driving the electric compressor to direct airflow through the first flow passage responsive to a torque demand greater than a threshold and a boost pressure greater than a manifold pressure.

FIG. 5 shows a method 500 for adjusting intake airflow through the first and second flow passages (such as the first and second flow passages 32 and 34, respectively, shown in FIG. 1B) in response to engine operating conditions. Specifically, method 500 continues on from method 200 to direct airflow through a second embodiment of the second flow passage, as shown in FIG. 1B. In this embodiment, directing airflow through the second flow passage includes flowing intake air from downstream of a charge air cooler on the first flow passage, through the second flow passage, and to the intake manifold.

Airflow may be directed through the second flow passage when torque demand increases above a threshold level (as described at 204 in method 200). Thus, after increasing the opening of the throttle (as described at 208 in method 200), the controller may drive the electric compressor and direct intake air through the second flow passage at 502. As discussed above, driving the compressor at 502 may include turning on the electric compressor and operating the electric compressor at a speed based on a required boost level for the torque demand. For example, the electric compressor may remain off until torque demand and/or pedal position increases above a threshold. At that point, the speed of the electric compressor may increase with increasing torque demand. In another example, the electric compressor may only turn on or off. As such, the electric compressor may only operate at one speed when turned on. In yet another example, the operation speed of the electric compressor may be based on an amount of power stored (e.g., power available) at the electric compressor. For example, if less power is available for electric compressor operation, the electric compressor may be driven at a lower speed than required by the boost level.

After turning on the electric compressor, the controller may adjust spark timing at 504. Spark timing adjustments may be based on a temperature of the charge air traveling through the second flow passage and entering the intake manifold of the engine. Since the second flow passage is coupled between the first flow passage, after the CAC, and the intake manifold in this embodiment, less spark retard may be necessary. For example, the air traveling through the second flow passage may be partially cooled (e.g., cooled by the CAC in the first flow passage). In some embodiments, if the second flow passage includes a charge air cooling element, little to no spark adjustments may be necessary at 504.

At 508, the method includes determining if MAP is at or above a threshold pressure. In one example, the threshold pressure is atmospheric pressure. In another example, the threshold pressure may be a pressure greater or less than atmospheric pressure. If MAP is still below the threshold pressure at 508, the controller maintains the current throttle opening at 510. Once MAP reaches and/or increases above the threshold pressure, the controller closes the throttle on the first flow passage and opens the CRV at 512. Closing the throttle and opening the CRV at 512 may include slowly decreasing the opening of the throttle and increasing the opening of the CRV to provide relatively smooth mass air flow to the engine intake. In this way, continuous mass air flow may be provided to the intake manifold.

During the driving the electric compressor, the turbine-driven compressor may be increasing speed. As a result, the boost pressure, downstream of the turbine-driven compressor, may increase. At 514, the method determines if the boost pressure is greater than MAP. If boost pressure is not greater than MAP, the controller continues driving the electric compressor and maintains the throttle closed at 516. However, if the boost pressure is greater than MAP, the method continues on to 518 to open the throttle to deliver the required boost for the torque demand. Upon opening the throttle, the controller stops driving the electric compressor and closes the CRV at 520. This may include stopping airflow through the second flow passage. Further, the method at 520 may include returning spark timing to its original or currently requested level. In some embodiments, the steps at 518 and 520 may occur concurrently to provide smooth and continuous mass air flow. In one example, this may include increasing the opening of the throttle while slowing down and eventually stopping the compressor.

Alternatively, if the electric compressor runs out of power before the boost pressure increase above MAP, the throttle may be opened anyway. For example, method 500 may have an extra step after 514 and before 516 which checks the power level of the electric compressor. If the power level of the electric compressor is below a threshold level, the method may continue on to 518 to re-open the throttle, even if boost pressure is not greater than MAP. The electric compressor would then be turned off at 520 so that it may re-charge for subsequent tip-ins.

In this way, a controller may adjust intake airflow through a first flow passage and a second flow passage in response to driving conditions. In one example, adjusting intake airflow includes increasing an opening of the throttle to direct airflow through the first flow passage responsive to a torque demand less than a threshold. In another example, adjusting intake airflow includes initially increasing an opening of the throttle and driving the electric compressor to simultaneously direct airflow through the first flow passage and the second flow passage responsive to a torque demand greater than a threshold. Then, the throttle may be closed and the compressor recirculation valve may be opened after the initial increase in opening responsive to a manifold pressure greater than atmospheric pressure. Adjusting intake airflow may further include increasing an opening of the throttle, closing the compressor recirculation valve, and stopping driving the electric compressor to direct airflow through the first flow passage responsive to a torque demand greater than a threshold and a boost pressure greater than a manifold pressure.

FIG. 4 illustrates a graphical example of throttle and electric compressor adjustments in response to engine operating conditions. The adjustments in FIG. 4 are for a first embodiment of a second flow passage as illustrated in FIG. 1A. Specifically, graph 400 shows changes in pedal position at plot 402, changes in torque demand at plot 404, changes in throttle position (TP) at plot 406, changes in MAP (e.g., manifold pressure) at plot 408, changes in boost pressure at plot 410, changes in electric compressor operation at plot 412, and changes in spark timing at plot 418. A tip-in may be indicated at plot 402 by a sudden increase in pedal position. The throttle position may be between a closed and fully open position, as shown at plot 406. In one example, base operation of the electric compressor may be off. Operation of the electric compressor and increases in electric compressor speed are indicated at plot 412. Finally, spark timing may be retarded or advanced from MBT, as shown at plot 418.

Before time t1, pedal position is at a steady position (plot 402), torque demand is below the threshold level 414 (plot 404), and spark timing is near MBT (plot 418). Further, the throttle is partially open (406), MAP and boost pressure are below the threshold pressure 416 (e.g., atmospheric pressure), and the electric compressor is off. As such, intake airflow may be traveling through the first flow passage and not through the second flow passage.

At time t1, pedal position increases gradually (plot 402). This causes torque demand to increase; however, it remains below the threshold level 414 (plot 404). As a result, throttle position increases (plot 406), thereby increasing mass air flow to the intake manifold. Boost pressure increases, increasing MAP above the threshold pressure 416 (plots 408 and 410). The electric compressor remains off since torque demand is less than the threshold level 414. Spark timing may retard slightly from MBT in response to the increase in pedal position. At time t2, pedal position decreases (plot 402) and returns to a steady, lower level. In response, torque demand and throttle position decrease, thereby decreasing MAP and boost pressure.

At time t3, a tip-in occurs, as indicated by a sudden increase in pedal position (plot 402), thereby increasing torque demand above the threshold level 414. In response to the tip-in, the controller increases the throttle opening so that it is fully opened (plot 406) and turns on the electric compressor. As such, charge air may be supplied to the intake manifold through both the first flow passage and the second flow passage from time t3 to time t4. MAP and boost pressure increase and at time t4, MAP reaches the threshold pressure 416. As a result, the throttle opening is decreased and eventually closed, cutting off airflow through the first flow passage. The controller continues to drive the electric compressor to provide boost to the intake manifold. Additionally, the controller may further retard spark at time t4 and continue retarding spark while the electric compressor is on and driving airflow through the second flow passage. Between time t4 and time t5, MAP continues to increase as intake air travels through the electric compressor and to the intake manifold. Meanwhile, as the turbine-driven compressor speeds up and continues to run, boost pressure increases (plot 410). At time t5, boost pressure increases above MAP. As a result, the controller increases the opening of the throttle to deliver the requested boot for the torque demand. The controller also stops driving the compressor, turning the compressor off and cutting off airflow through the second flow passage (plot 412). At time t6, the tip-in ends, decreasing torque demand and the throttle opening.

At time t7, another tip-in occurs (plot 402). Torque demand increases above the threshold level 414. However, the torque loss due to retarding spark when directing airflow through the second flow passage may be greater than the torque loss due to turbo lag when directing airflow through the first flow passage. Thus, even though torque demand is greater than the threshold level 414, the controller opens the throttle to direct airflow through the first flow passage (plot 406) and maintains the electric compressor off (plot 412). At time t8, the tip-in ends and the throttle opening is returned to the currently demanded level.

As shown in graph 400, intake airflow may be directed through first and second parallel flow passages. In one example, during a first condition (as shown at times t1 and t7), intake airflow is directed through the first flow passage including a throttle and a turbine-driven compressor. Directing intake airflow through the first flow passage includes increasing an opening of the throttle. In a first example, as shown at time t1, the first condition includes when a torque demand is less than a threshold. In a second example, as shown at time t7, the first condition includes when the torque demand is greater than the threshold and a torque loss from retarding spark due to directing intake airflow through the second flow passage is greater than a torque loss from turbo lag.

In another example, during a second condition (as shown at time t4), intake airflow is directed through a second flow passage including an electric compressor, the second flow passage parallel to the first flow passage. Directing intake airflow through the second flow passage includes driving the electric compressor and closing the throttle when a manifold pressure is at or greater than a threshold pressure. As shown at time t4, the second condition includes when a torque demand in greater than a threshold and a torque loss from retarding spark during the directing intake airflow through the second flow passage is less than a torque loss from turbo lag.

During a third condition, as shown at time t5, when a boost pressure is greater than the manifold pressure during driving intake airflow through the second flow passage, the throttle is opened to direct intake airflow through the first flow passage. Further, during the third condition, the controller stops driving the electric compressor to stop airflow from flowing through the second flow passage.

FIG. 6 illustrates a graphical example of throttle, compressor recirculation valve (CRV), and electric compressor adjustments in response to engine operating conditions. The adjustments in FIG. 6 are for a second embodiment of a second flow passage as illustrated in FIG. 1B. Specifically, graph 600 shows changes in pedal position at plot 602, changes in torque demand at plot 604, changes in throttle position (TP) at plot 606, changes in MAP (e.g., manifold pressure) at plot 608, changes in boost pressure at plot 610, changes in electric compressor operation at plot 612, changes in spark timing at plot 618, and changes in CRV position at plot 620. A tip-in may be indicated at plot 602 by a sudden increase in pedal position. The throttle position may be between a closed and fully open position, as shown at plot 606. In one example, base operation of the electric compressor may be off. Operation of the electric compressor and increases in electric compressor speed are indicated at plot 612. Additionally, the CRV position may be between a closed and fully open position, as shown at plot 620. However, in alternate examples, the position of the CRV may be between closed and fully opened. Finally, spark timing may be retarded or advanced from MBT, as shown at plot 618.

Before time t1, pedal position is at a steady position (plot 602), torque demand is below the threshold level 614 (plot 604), and spark timing is near MBT (plot 618). Further, the throttle is partially open (plot 606), MAP and boost pressure are below the threshold pressure 616 (e.g., atmospheric pressure), the electric compressor is off (plot 612), and the CRV is closed (plot 620). As such, intake airflow may be traveling through the first flow passage and not through the second flow passage.

At time t1, pedal position increases gradually (plot 602). This causes torque demand to increase; however, it remains below the threshold level 614 (plot 604). As a result, throttle position increases (plot 606), thereby increasing mass air flow to the intake manifold. Boost pressure increases, increasing MAP above the threshold pressure 616 (plots 608 and 610). The electric compressor remains off and the CRV remains closed since torque demand is less than the threshold level 614. Spark timing may retard slightly from MBT in response to the increase in pedal position. At time t2, pedal position decreases (plot 602) and returns to a steady, lower level. In response, torque demand and throttle position decrease, thereby decreasing MAP and boost pressure.

At time t3, a tip-in occurs, as indicated by a sudden increase in pedal position (plot 602), thereby increasing torque demand above the threshold level 614. In response to the tip-in, the controller increases the throttle opening so that it is fully opened (plot 606) and turns on the electric compressor. As such, charge air may be supplied to the intake manifold through both the first flow passage and the second flow passage from time t3 to time t4. MAP and boost pressure increase and at time t4, MAP reaches the threshold pressure 616. As a result, the throttle opening is decreased and eventually closed, cutting off airflow through the first flow passage. At this time, the controller opens the CRV (plot 620). In alternate embodiments, opening the CRV at time t4 may include partially opening the CRV. The controller continues to drive the electric compressor to provide boost to the intake manifold. Additionally, the controller may further retard spark at time t4 and continue retarding spark while the electric compressor is on and driving airflow through the second flow passage. However, less spark retard may be required in this second embodiment of the second flow passage than in the first embodiment of the second flow passage, as shown in FIG. 4. Between time t4 and time t5, MAP continues to increase as intake air travels through the electric compressor and to the intake manifold. Meanwhile, as the turbine-driven compressor speeds up and continues to run, boost pressure increases (plot 610). At time t5, boost pressure increases above MAP. As a result, the controller closes the CRV and increases the opening of the throttle to deliver the requested boost for the torque demand. The controller also stops driving the compressor, turning the compressor off and cutting off airflow through the second flow passage (plot 612). At time t6, the tip-in ends, decreasing torque demand and the throttle opening.

As shown in graph 600, intake airflow may be directed through first and second flow passages. In one example, during a first condition (as shown at time t1), intake airflow is directed through the first flow passage including a throttle and a turbine-driven compressor. Directing intake airflow through the first flow passage includes increasing an opening of the throttle. As shown at time t1, the first condition includes when a torque demand is less than a threshold.

In another example, during a second condition (as shown at time t4), intake airflow is directed through a second flow passage including an electric compressor, the second flow passage coupled between the first flow passage, downstream of a charge air cooler, and an intake manifold. Directing intake airflow through the second flow passage includes driving the electric compressor and closing the throttle and opening a compressor recirculation valve when a manifold pressure is at or greater than a threshold pressure. As shown at time t4, the second condition includes when a torque demand in greater than a threshold.

During a third condition, as shown at time t5, when a boost pressure is greater than the manifold pressure during driving intake airflow through the second flow passage, the throttle is opened to direct intake airflow through the first flow passage. Further, during the third condition, the controller stops driving the electric compressor to stop airflow from flowing through the second flow passage and closes the compressor recirculation valve.

In this way, in response to a torque demand and engine operating conditions, required boost for the torque demand may be provided by adjusting airflow through first and second induction flow passages. The first flow passage may include a throttle and a turbine driven compressor. In one example, in response to a tip-in, a controller may simultaneously direct intake airflow through the first flow passage and the second flow passage by increasing the opening the throttle positioned in the first flow passage and driving an electric compressor positioned in the second flow passage. When a manifold pressure reaches atmospheric pressure, the controller may close the throttle and continue driving the electric compressor. In some embodiments, the controller may additionally open a compressor recirculation valve. The electric compressor may provide the required boost to the intake manifold while a boost pressure downstream of the turbine-driven compressor increases. When the boost pressure in the second flow passage increases above the manifold pressure, the controller may re-open the throttle to provide additional boost and stop driving the compressor. In this way, turbo lag may be reduced and required boost for the torque demand may be provided to the engine.

An embodiment relates to an engine system comprising an induction system with two parallel flow passages to an intake manifold of the engine, a first flow passage including a throttle and a turbine-driven compressor, a second flow passage, parallel to the first flow passage, including an electric compressor, and a controller with computer readable instructions for adjusting intake airflow through the first flow passage and the second flow passage in response to driving conditions. In one example, adjusting intake airflow includes increasing an opening of the throttle to direct airflow through the first flow passage responsive to a torque demand less than a threshold. In another example, adjusting intake airflow includes initially increasing an opening of the throttle to direct airflow through the first flow passage and driving the electric compressor to direct airflow through the second flow passage responsive to a torque demand greater than a threshold and closing the throttle after the initial increase in opening responsive to a manifold pressure greater than atmospheric pressure. Adjusting intake airflow further includes increasing an opening of the throttle to direct airflow through the first flow passage responsive to a torque demand greater than a threshold and a boost pressure greater than a manifold pressure.

Another embodiment relates to an engine system comprising an induction system with two flow passages to an intake manifold of the engine; a first flow passage including a throttle, a charge air cooler, a turbine-driven compressor, and a compressor recirculation valve operable to direct airflow around the turbine-driven compressor; a second flow passage, coupled between the first flow passage, downstream of the charge air cooler, and the intake manifold, including an electric compressor; and a controller with computer readable instructions for adjusting intake airflow through the first flow passage and the second flow passage in response to driving conditions. In one example, adjusting intake airflow includes increasing an opening of the throttle to direct airflow through the first flow passage responsive to a torque demand less than a threshold. In another example, adjusting intake airflow includes initially increasing an opening of the throttle to direct airflow through the first flow passage and driving the electric compressor to direct airflow through the second flow passage responsive to a torque demand greater than a threshold and closing the throttle and opening the compressor recirculation valve after the initial increase in opening responsive to a manifold pressure greater than atmospheric pressure. Adjusting intake airflow further includes increasing an opening of the throttle to direct airflow through the first flow passage responsive to a torque demand greater than a threshold and a boost pressure greater than a manifold pressure.

A further embodiment relates to an engine method comprising directing intake airflow through a flow passage including a turbine-driven compressor followed by a charge air cooler with a compressor bypass valve opened, while compressing air cooled by the charge air cooler by an electrically-driven compressor and directing it to an intake manifold. The directing is in response to a driver tip-in, and the compressing by the electrically-driven compressor is reduced while closing the compressor bypass valve after the turbine-driven compressor is spun up to a threshold level. Further, the air compressed by the electrically-driven compressor is delivered to the intake manifold while bypassing a throttle in a parallel passage. Additionally, an exhaust gas recirculation valve is fully closed while directing intake airflow through the flow passage and compressing air cooled by the charge air cooler.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:

1. An engine method, comprising:
in response to a driver tip-in, temporarily opening a throttle in a first induction flow passage, downstream of an exhaust-driven turbocharger compressor, and electrically driving an electric compressor to drive flow into an intake manifold through a second induction flow passage, the second induction flow passage coupled between the first induction flow passage, downstream of a charge air cooler, and the intake manifold; and
in response to a pressure of the intake manifold increasing to a threshold pressure during the driving the electric compressor, closing the throttle and opening a compressor recirculation valve configured to divert intake air around the turbocharger compressor.

2. The method of claim 1, wherein temporarily opening the throttle includes opening the throttle to a threshold opening and maintaining the threshold opening to increase a manifold pressure from below the threshold pressure to the threshold pressure.

3. The method of claim 1, wherein closing the throttle and opening the compressor recirculation valve includes slowly decreasing the opening of the throttle while slowly increasing the opening of the compressor recirculation valve to provide relatively smooth mass air flow to the intake manifold.

4. The method of claim 1, wherein the threshold pressure is atmospheric pressure.

5. The method of claim 1, wherein electrically driving the electric compressor includes driving the electric compressor at a speed based on a required boost level for a torque demand during the tip-in.

6. The method of claim 1, further comprising re-opening the throttle in response to a boost pressure being greater than the pressure of the intake manifold.

7. The method of claim 6, further comprising, upon re-opening the throttle, stopping electrically driving the electric compressor and closing the compressor recirculation valve.

8. The method of claim 6, wherein the re-opening the throttle is further responsive to a power level of the electric compressor decreasing below a threshold level, even if boost pressure is not greater than the pressure of the intake manifold.

9. The method of claim 1, wherein the driver tip-in is indicated by an increase in pedal position and further comprising, in response to a torque demand being less than a threshold torque demand, directing intake air through the first induction flow passage, maintaining the electric compressor off, and adjusting the throttle based on the torque demand to supply a required mass air flow for the torque demand.

10. The method of claim 1, further comprising adjusting spark timing during the driving the electric compressor based on a temperature at the intake manifold.

11. An engine method, comprising:
during a first condition, directing intake airflow through a first flow passage including a first throttle and a turbine-driven compressor and adjusting the first throttle to deliver a demanded torque;
during a second condition, directing intake airflow through a second flow passage including an electric compressor, the second flow passage coupled between the first flow passage, downstream of a charge air cooler, and an intake manifold; and
during the second condition, in response to a pressure of the intake manifold reaching or increasing above a threshold pressure, closing the first throttle and opening a compressor recirculation valve disposed in a passage around the turbine-driven compressor.

12. The method of claim 11, wherein the demanded torque is a driver demanded torque and wherein directing intake airflow through the first flow passage includes increasing an opening of the first throttle in response to the driver demanded torque to supply a required mass air flow for the driver demanded torque.

13. The method of claim 11, wherein the first condition includes when a torque demand is at or less than a threshold and the second condition includes when the torque demand is greater than the threshold.

14. The method of claim 11, wherein directing intake airflow through the second flow passage includes driving the electric compressor, wherein the second flow passage includes a second throttle, and further comprising adjusting the second throttle to vary an amount of intake air provided to the intake manifold from the second flow passage.

15. The method of claim 11, wherein the first condition includes when torque demand is at or less than a threshold and when a determined torque loss from spark retard is not less than a torque loss from turbo lag and the second condition includes when the torque demand is greater than the threshold and the determined torque loss from spark retard is less than the torque loss from turbo lag.

16. The method of claim 11, further comprising, during a third condition, when a boost pressure is greater than the pressure of the intake manifold during driving intake airflow through the second flow passage, opening the first throttle to direct intake airflow through the first flow passage, stopping driving the electric compressor, and closing the compressor recirculation valve.

17. An engine method, comprising:
directing intake airflow through a flow passage including a turbine-driven compressor followed by a charge air cooler with a compressor recirculation valve opened, where the compressor recirculation valve is configured to divert intake air around the turbine-driven compressor; while
compressing air cooled by the charge air cooler by an electrically-driven compressor and directing it to an intake manifold.

18. The engine method of claim 17, wherein the directing is in response to a driver tip-in, and where the compressing by the electrically-driven compressor is reduced while closing the compressor recirculation valve after the turbine-driven compressor is spun up to a threshold level.

19. The engine method of claim 17, wherein the air compressed by the electrically-driven compressor is delivered to the intake manifold while bypassing a throttle in a parallel passage.

20. The engine method of claim 17, wherein an exhaust gas recirculation valve is fully closed while directing intake airflow through the flow passage and compressing air cooled by the charge air cooler and further comprising adjusting spark timing during compressor air cooled by the charge air cooler by the electrically-driven compressor.

* * * * *